(12) United States Patent
Thompson et al.

(10) Patent No.: US 7,548,859 B2
(45) Date of Patent: *Jun. 16, 2009

(54) METHOD AND SYSTEM FOR ASSISTING USERS IN INTERACTING WITH MULTI-MODAL DIALOG SYSTEMS

(75) Inventors: William K. Thompson, Evanston, IL (US); Hang S. Lee, Hillsdale (AU); Anurag K. Gupta, Kolkata (IN)

(73) Assignee: Motorola, Inc., Schaumburg, IL (US)

( * ) Notice: Subject to any disclaimer, the term of this patent is extended or adjusted under 35 U.S.C. 154(b) by 380 days.

This patent is subject to a terminal disclaimer.

(21) Appl. No.: 11/196,112

(22) Filed: Aug. 3, 2005

(65) Prior Publication Data

US 2007/0033526 A1 Feb. 8, 2007

(51) Int. Cl.
*G10L 21/00* (2006.01)

(52) U.S. Cl. .......................... 704/270; 704/257; 704/9; 704/7; 704/251

(58) Field of Classification Search .................. 704/9, 704/8, 7, 4, 3, 270, 257, 276, 10, 251, 252, 704/255, 275
See application file for complete search history.

(56) References Cited

U.S. PATENT DOCUMENTS

| | | | |
|---|---|---|---|
| 5,878,274 A * | 3/1999 | Kono et al. ................. | 711/170 |
| 5,890,122 A * | 3/1999 | Van Kleeck et al. ......... | 704/275 |
| 5,983,190 A * | 11/1999 | Trower et al. ............... | 704/276 |
| 6,094,635 A * | 7/2000 | Scholz et al. ............... | 704/270 |
| 6,182,046 B1 | 1/2001 | Ortega et al. | |
| 6,188,985 B1 * | 2/2001 | Thrift et al. .................. | 704/275 |
| 6,208,971 B1 * | 3/2001 | Bellegarda et al. .......... | 704/275 |
| 6,208,972 B1 * | 3/2001 | Grant et al. ................. | 704/275 |
| 6,456,972 B1 * | 9/2002 | Gladstein et al. ............ | 704/257 |
| 6,735,592 B1 * | 5/2004 | Neumann et al. ........... | 707/101 |
| 2003/0061029 A1 * | 3/2003 | Shaket ........................... | 704/9 |
| 2003/0093419 A1 * | 5/2003 | Bangalore et al. .............. | 707/3 |
| 2003/0234818 A1 | 12/2003 | Schmid et al. | |
| 2004/0006475 A1 | 1/2004 | Ehlen et al. | |

OTHER PUBLICATIONS

Hirohiko Sagawa, Correction Grammars for Error Handling in a Speech Dialog System , Jun. 30 2004,Carnegie mellon University, pp. 1-4.*

* cited by examiner

*Primary Examiner*—Vijay B Chawan

(57) ABSTRACT

A method and system for assisting a user in interacting with a multi-modal dialog system (104) is provided. The method includes interpreting a "What Can I Do? (WCID)" question from a user in a turn of the dialog. A multi-modal grammar (212) is generated, based on the current context of the dialog. One or more user multi-modal utterances are generated, based on the WCID question and the multi-modal grammar. One or more user multi-modal utterances are conveyed to the user.

13 Claims, 6 Drawing Sheets

METHOD AND SYSTEM FOR ASSISTING USERS IN INTERACTING WITH MULTI-MODAL DIALOG SYSTEMS

RELATED APPLICATIONS

This application is related to U.S. patent application Ser. No. 11/004,339, filed on Dec. 3, 2004, entitled "Method and System for Generating Input Grammars for Multimodal Dialog Systems".

FIELD OF THE INVENTION

This invention is in the field of software, and more specifically in the field of software that assists users in interacting with multi-modal dialog systems.

BACKGROUND

Dialog systems are systems that allow a user to interact with a computer system to perform tasks such as retrieving information, conducting transactions, and other such problem solving tasks. A dialog system can use several modalities for interaction. Examples of modalities include speech, gesture, touch, and handwriting. User-computer interactions in dialog systems are enhanced by employing multiple modalities in a coordinated manner. Dialog systems using multiple modalities for user-computer interaction are referred to as multi-modal dialog systems. The user interacts with a multi-modal dialog system by using multiple modalities that are coordinated as a dialog-based user interface. The user interface is referred to as a multi-modal dialog interface. A set of interactions of the user with the dialog system is referred to as a dialog. Each interaction is known as a turn of the dialog. The information provided by either the user or the dialog system is referred to as a context of the dialog.

To effectively use a multi-modal user interface, a user should know which modalities to use and the method of using them, in a coordinated manner in different turns of a dialog. Further, the utilization of the multi-modal user interface of a dialog system can be difficult to use, due either to the lack of experience with using the system, or to changes in the availability and capability of modalities during a dialog.

Known dialog-based systems do not help a user to use different modalities in a coordinated manner. Further, these dialog systems do not take into account modality availability information. Moreover, the dialog systems do not provide a response to the questions asked by users in a dialog related to the use of different modalities.

BRIEF DESCRIPTION OF THE DRAWINGS

The present invention is illustrated by way of example, and not limitation, by the accompanying figures, in which like references indicate similar elements, and in which.

Figure 1:
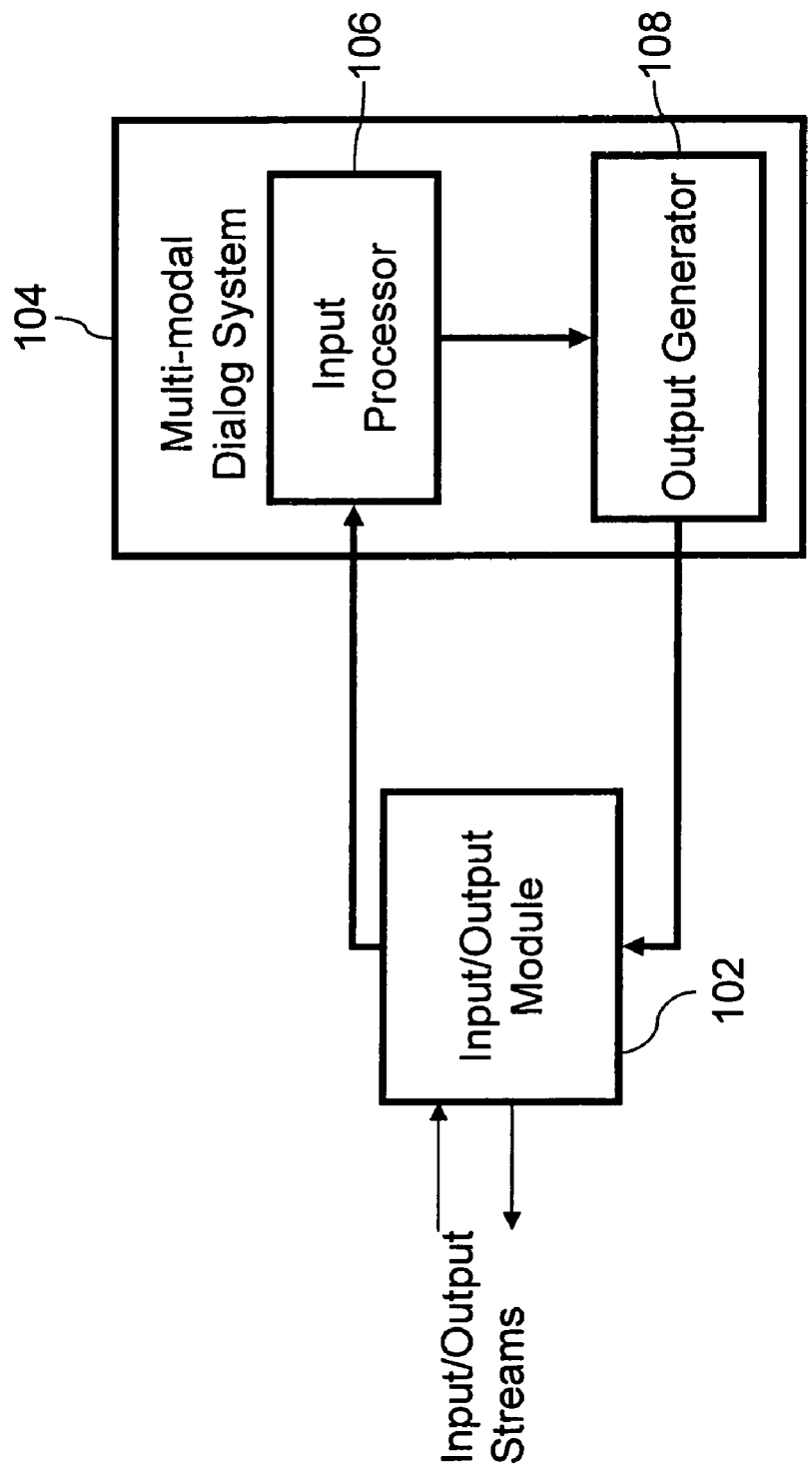
FIG. 1 is a block diagram of a multi-modal dialog system, in accordance with some embodiments of the present invention.

Those skilled in the art will appreciate that the elements in the figures are illustrated for simplicity and clarity, and have not been necessarily drawn to scale. For example, the dimensions of some of the elements in the figures may be exaggerated, relative to other elements, for an improved perception of the embodiments of the present invention.

DETAILED DESCRIPTION OF THE DRAWINGS

Before describing in detail a method and system for assisting a user in interacting with a multi-modal dialog system, in accordance with the present invention, it should be observed that the present invention resides primarily in combinations of method steps and apparatus components related to multi-modal dialog-based user interfaces. Apparatus components and method steps have been represented accordingly, where appropriate, by conventional symbols in the drawings. These drawings show only specific details that are pertinent for understanding the present invention, so as not to obscure the disclosure with details that will be apparent to those with ordinary skill in the art and the benefit of the description herein.

Referring to FIG. 1, a block diagram shows a representative environment in which the present invention may be practiced, in accordance with some embodiments of the present invention. The representative environment includes an input-output module 102 and a multi-modal dialog system 104. The input-output module 102 receives user inputs and displays system outputs. In an embodiment of the invention, the input-output module 102 is a user interface such as a computer monitor, a touch screen, or a keyboard. A user interacts with the multi-modal dialog system 104 through the input-output module 102. The user provides an input by using various modalities through one or more input-output modules, of which one input-output module 102 is shown. Examples of various modalities include, but are not limited to, voice, gesture, and handwriting. In an embodiment of the invention, the user interacts with the multi-modal dialog system 104 by using one or more modalities in a coordinated manner. In other words, the multi-modal dialog system 104 uses a combined interpretation of user inputs provided through various modalities. For example, a user can say, "I want to find all the restaurants here", touching an area on a map displayed on a touch screen. In this case, the multi-modal dialog system 104 combines the inputs provided through speech and gesture, to generate a combined interpretation. In another embodiment of the invention, in order to issue a correct query, the user may ask the multi-modal dialog system 104 how various modalities can be used in a coordinated manner. This type of question is referred to as a "What Can I Do?" (WCID) question.

The multi-modal dialog system 104 includes an input processor 106 and an output generator 108. The input processor 106 interprets and processes the inputs as well the WCID questions, and provides the interpretation and answers to the output generator 108. The output generator 108 receives the WCID answers and presents them to the input-output module 102.

Figure 2:
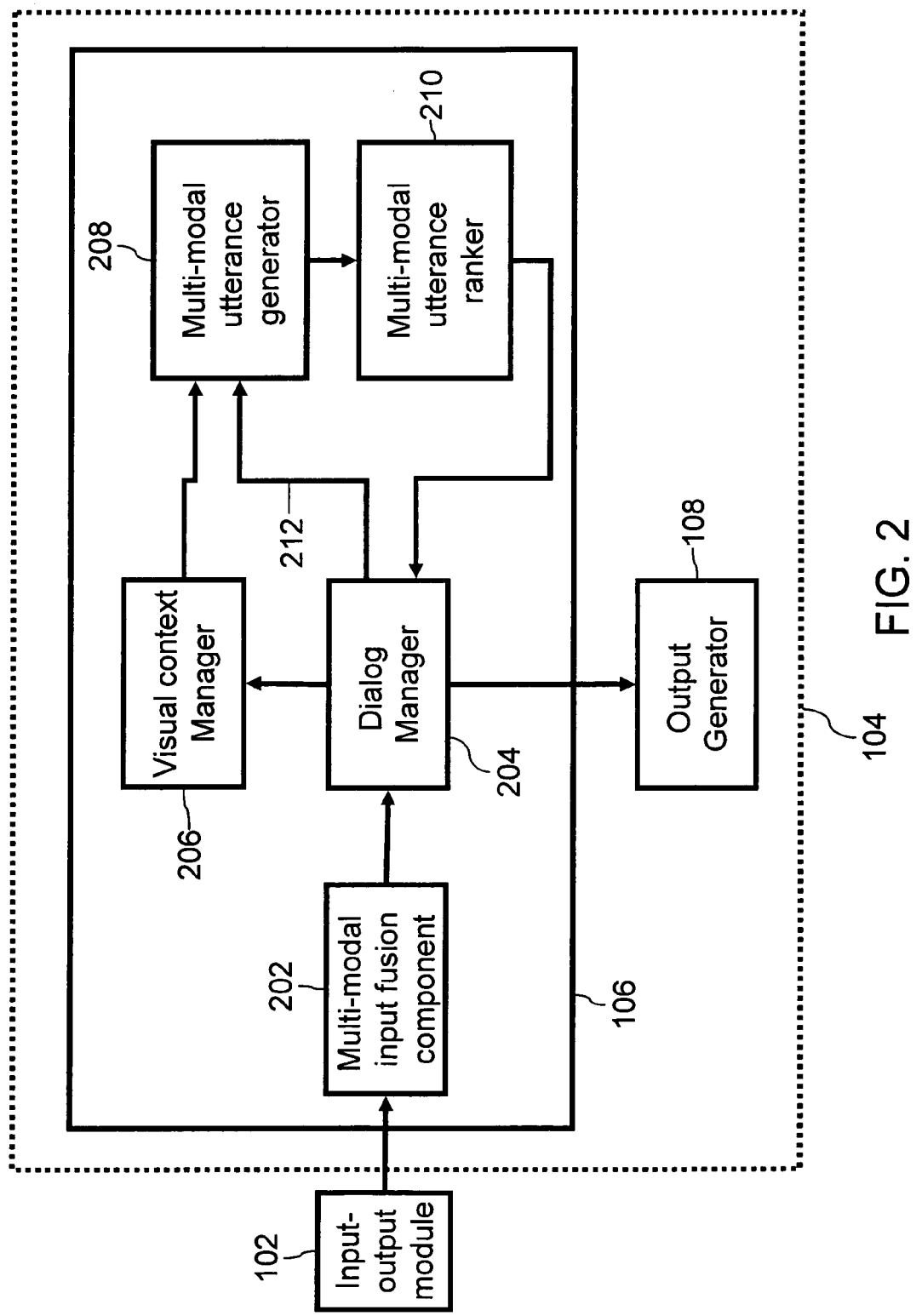
FIG. 2 is a block diagram of an input processor in a multi-modal dialog system, in accordance with some embodiments of the present invention.

Referring to FIG. 2, a block diagram shows the input processor 106 in the multi-modal dialog system 104 for assisting a user, in accordance with some embodiments of the present invention. The input processor 106 includes a Multi-Modal Input Fusion (MMIF) component 202, a dialog manager 204, a visual context manager 206, a multi-modal utterance generator 208, and a multi-modal utterance ranker 210. The MMIF component 202 accepts and interprets a user WCID question in a dialog. The MMIF component 202 maintains a record of modality capability information. In other words, the MMIF component 202 maintains a record of the capabilities of the modalities that were used by the user at each previous turn of the dialog. Further, the MMIF component 202 updates the record of modality capability information at the turn of the dialog. The dialog manager 204 generates a multi-modal grammar 212, based on a current context of the dialog. The information provided by a user in a previous turn or turns of the dialog is referred to as the current context of the dialog. A multi-modal grammar refers to a set of rules that are used to interpret a user input in the next turn of the dialog. Further, the dialog manager 204 maintains and updates the contexts of the dialog. The visual context manager 206 maintains a list of a set of concepts and objects that are visible to the user, as well as a list of objects that are in the dialog focus but are not visible in the current turn of the dialog. For example, the visual context manager 206 can maintain a place on a map displayed to the user, or a place mentioned in the previous turn of the dialog that is not shown on the user interface of the input-output module 102.

The multi-modal utterance generator 208 accepts the multi-modal grammar 212 and the visual context information from the dialog manager 204 and the visual context manager 206, respectively. The multi-modal utterance generator 208 generates one or more user multi-modal utterances based on a user WCID question, the multi-modal grammar 212 and the visual context information. A user multi-modal utterance may be a natural language sentence that the multi-modal dialog system can articulate to a user, using speech, with multi-modal coordination between certain words in the sentence. A multi-modal coordination specifies the sequence of modalities to be used and a temporal order between the modalities. A temporal order specifies the time gap between the use of the modalities. The multi-modal utterance ranker 210 ranks one or more user multi-modal utterances, based on the current context of the dialog, a task model, and the modality availability information. A task model is a data structure used to model a task that is to be performed. The task model elaborates on the knowledge necessary for completing the task. One or more ranked user multi-modal utterances are conveyed to the user through the output generator 108.

Figure 3:
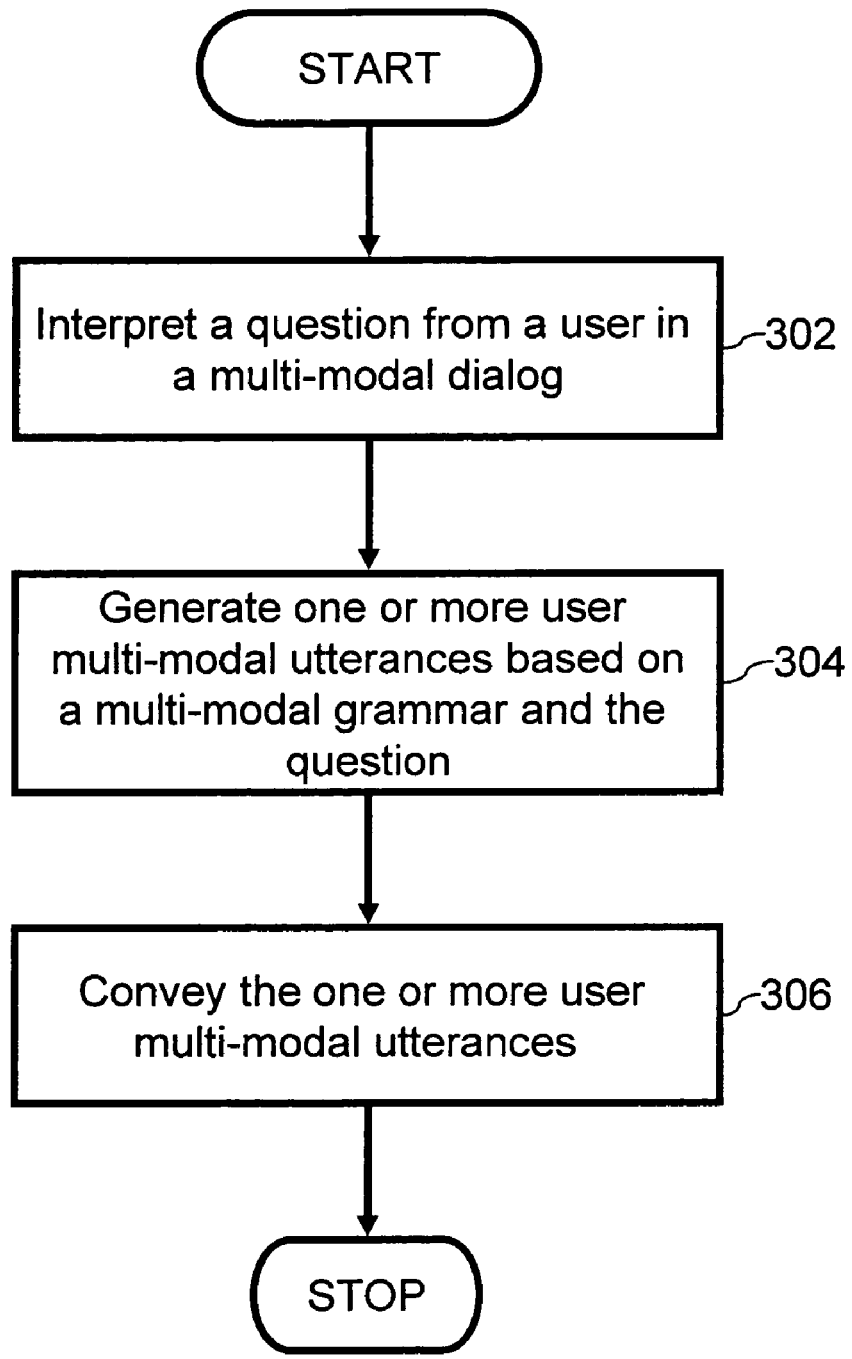
FIG. 3 is a flowchart illustrating a method for assisting a user in interacting with a multi-modal dialog system, in accordance with an embodiment of the present invention.

Referring to FIG. 3, a flowchart illustrates a method for assisting a user in interacting with the multi-modal dialog system 104, in accordance with an embodiment of the present invention. At step 302, the MMIF component 202 interprets a question, such as a WCID question, from a user interacting with the multi-modal dialog system 104. At step 304, one or more user multi-modal utterances are generated by the multi-modal utterance generator 208. The one or more user multi-modal user utterances are based on the WCID question and the multi-modal grammar 212 generated by the dialog manager 204. In one embodiment of the invention, the one or more user multi-modal utterances are further based on the visual context information. The multi-modal grammar 212 is generated by the dialog manager 204 based on the current context of the dialog. Thereafter, at step 306, the one or more user multi-modal utterances are conveyed to the user through the output generator 108.

Figure 4:
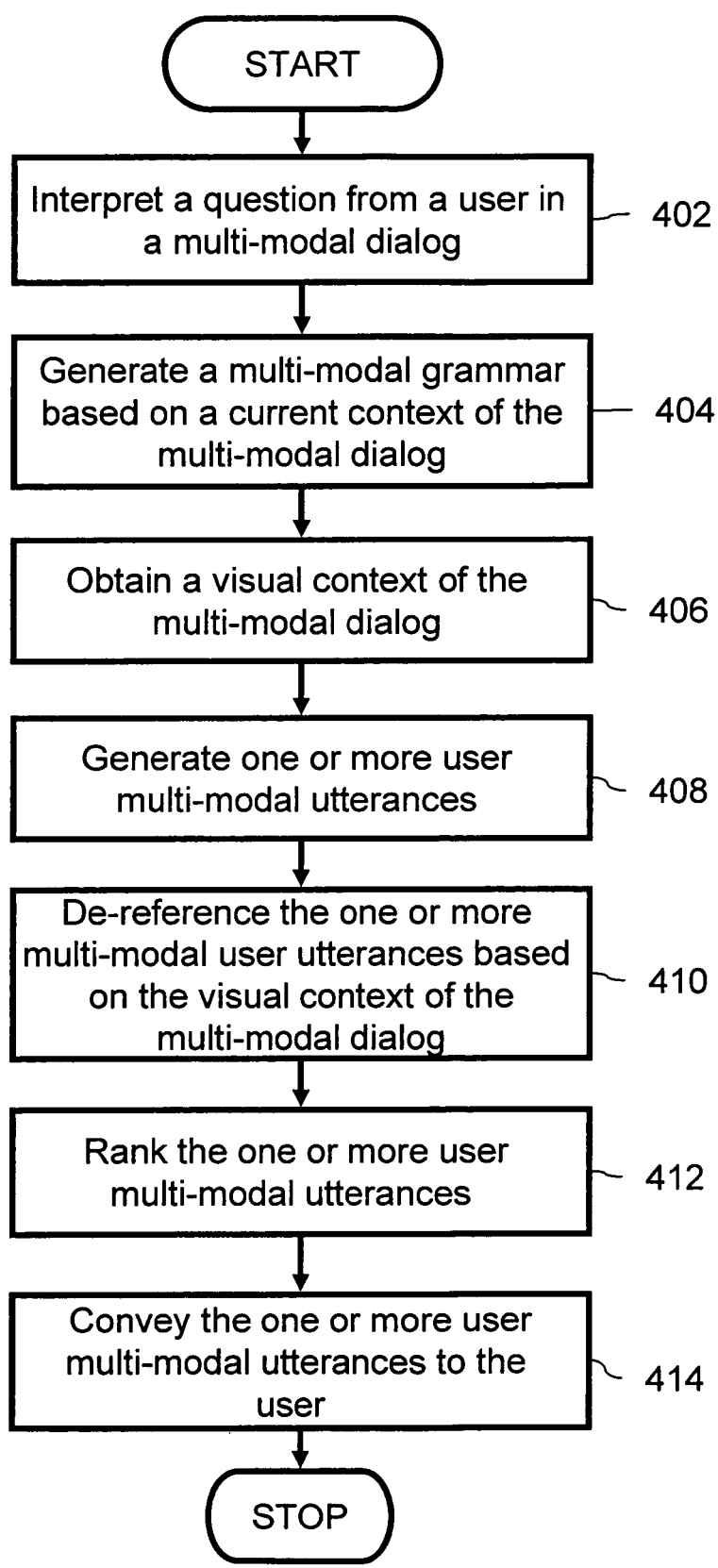
FIG. 4 is a flowchart illustrating a method for assisting a user in interacting with the multi-modal dialog system, in accordance with another embodiment of the present invention.

Referring to FIG. 4, a flowchart illustrates a method for assisting a user in interacting with the multi-modal dialog system 104, in accordance with some embodiments of the present invention. At step 402, the MMIF component 202 interprets a question, such as a WCID question, from a user interacting with the multi-modal dialog system 104. At step 404, the multi-modal grammar 212 is generated by the dialog manager 204. Generation of the multi-modal grammar 212 is based on the current context of the dialog. In other words, it is based on information provided by the user in the previous turns of the dialog. The multi-modal grammar 212 defines a sequence of words that a user may provide in the multi-modal inputs in the next turn of the dialog. An exemplary multi-modal grammar rule is explained in conjunction with FIG. 5. At step 406, a visual context of the multi-modal dialog is obtained. The visual context refers to objects that are visible to the user on the user interface of the input-output module 102. The visual context information may also include objects that are in the dialog focus but are not currently visible. For example, the visual context may include a place mentioned by the user in the previous turn of a dialog. Thereafter, at step 408, one or more user multi-modal utterances are generated, based on the multi-modal grammar 212 and the WCID question. The one or more user multi-modal utterances are generated by parsing the multi-modal grammar 212. At step 410, the one or more user multi-modal utterances are de-referenced, based on the visual context information. De-referencing is carried out to include in a user utterance instructions for any non-speech input that the user has to enter in coordination with the speech input. Thereafter, at step 412, one or more user multi-modal utterances are ranked and a list is generated, based on the rankings. In one embodiment of the invention, the ranking is based on a task model, the modality preferences of the user, and modality availability information. At step 414, the ranked one or more user multi-modal utterances are conveyed to the user through the output generator 108. The output reflects the modalities to be used for providing user inputs. For example, the input-output module 102 may direct the user by saying, "You can circle an area on the map", using speech while showing a circle with ink on the user interface of the input-output module 102 to indicate the area.

The one or more user multi-modal utterances are generated, based on the multi-modal grammar 212. For example, in a multi-modal dialog, at a particular turn, the dialog manager 204 expects the user to make a request to go to a certain place. Accordingly, the dialog manager 204 generates the multi-modal grammar 212. The multi-modal grammar 212 is illustrated in FIG. 5

Figure 5:
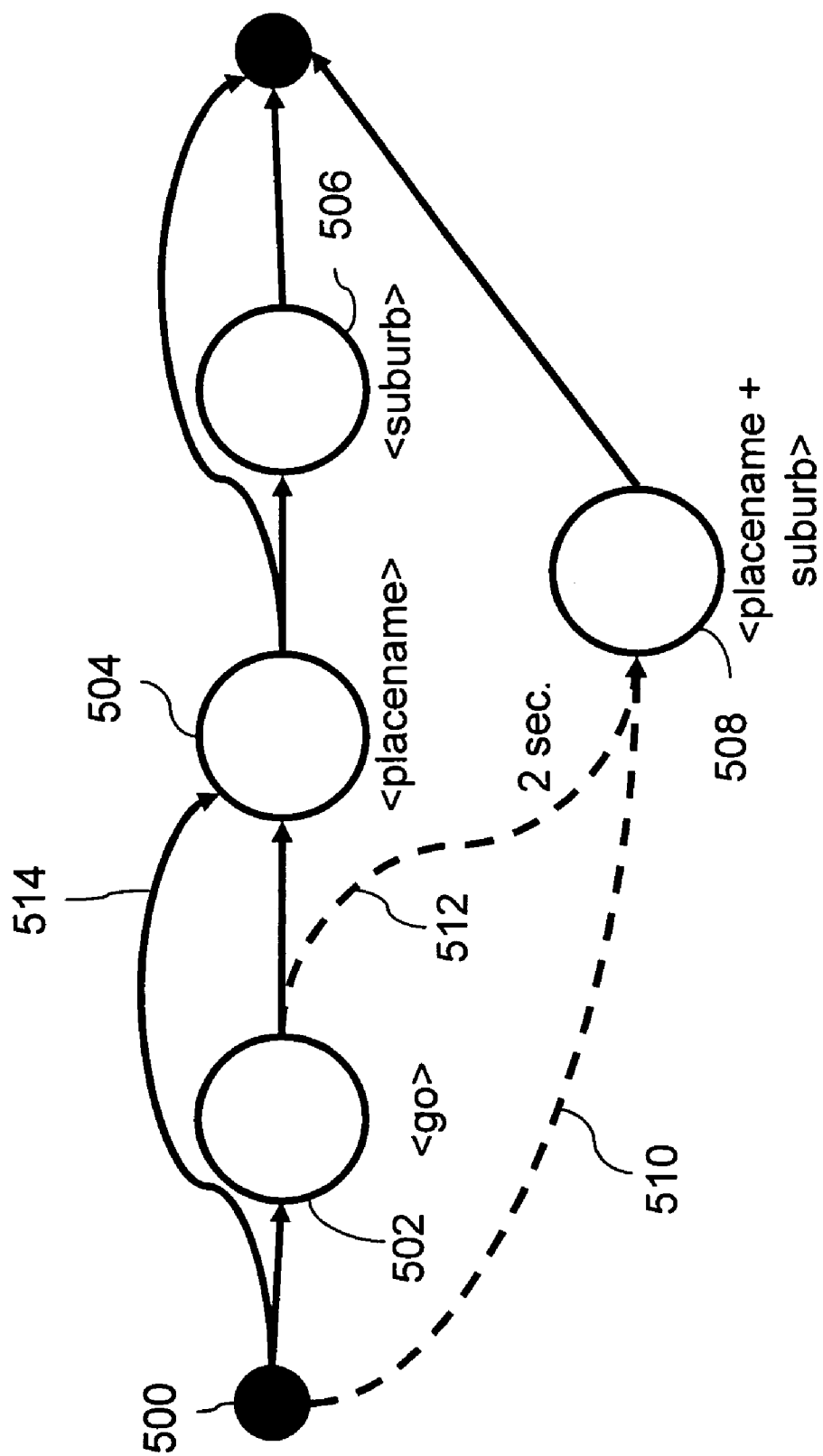
FIG. 5 is a block diagram of an exemplary multi-modal grammar rule, in accordance with one embodiment of the present invention.

Referring to FIG. 5, a block diagram represents the multi-modal grammar 212, generated by the dialog manager 204, in accordance with some embodiments of the invention. The multi-modal grammar 212 is a network of a plurality of non-terminals, hereinafter referred to as non-terminals 502, 504, 506, and 508. Each non-terminal represents semantic information relevant to a dialog. For example, non-terminals may represent a place by a combination of street name and suburb name. The modality-capability information provided by the MMIF component 202 is also attached to each non-terminal.

The multimodal grammar 212 further comprises one or more connections, such as a connection 510 and a connection 514. The connection 510 indicates that the modality used is touch, whereas the connection 514 shows that the modality used is speech. The dialog information is represented according to defined rules attached to the non-terminals 502, 504, 506 and 508, and the connections 510, 512 and 514. An example of a rule is the modality capability rule which specifies how the modalities may be used by a user to provide an input. In an embodiment of the invention, a rule is a sequence of non-terminals, to be provided using the same modality.

For example, speech may be used for the sequence of non-terminals 502, 504 and 506. Similarly, touch may generate the semantic information for both place name and suburb, as represented by the non-terminal 508 and the connection 512. The multi-modal grammar 212 is elaborated on with the help of a vocabulary of relevant modalities. For the example given above, the user can provide an input by saying, "Go", followed by the street name and then the suburb name. Alternately, the user can say "Go", and indicate the street and suburb by touching a point on a map displayed on the user interface. Depending on the multi-modal grammar the user multi-modal utterances are generated. For the example given above, a user multi-modal utterance would be "you can say 'go to this place', followed by touching a point on the map to identify the place."

If the visual context information is available, user multi-modal utterances are de-referenced. In the multi-modal dialog given above, if the user had mentioned that he wished to go to 'Chitpole' restaurant in the previous dialog turn, then the above-mentioned user multi-modal utterance is modified as "you can say go to the restaurant to go to the Chipotle restaurant."

In one embodiment of the invention, the user's WCID question includes information about the particular modality through which the user wants to provide the input. For example, if the user wants to use a gesture modality to provide the next input, then the multi-modal utterance generator 208 generates the user multi-modal utterances according to the selected modality.

Figure 6:
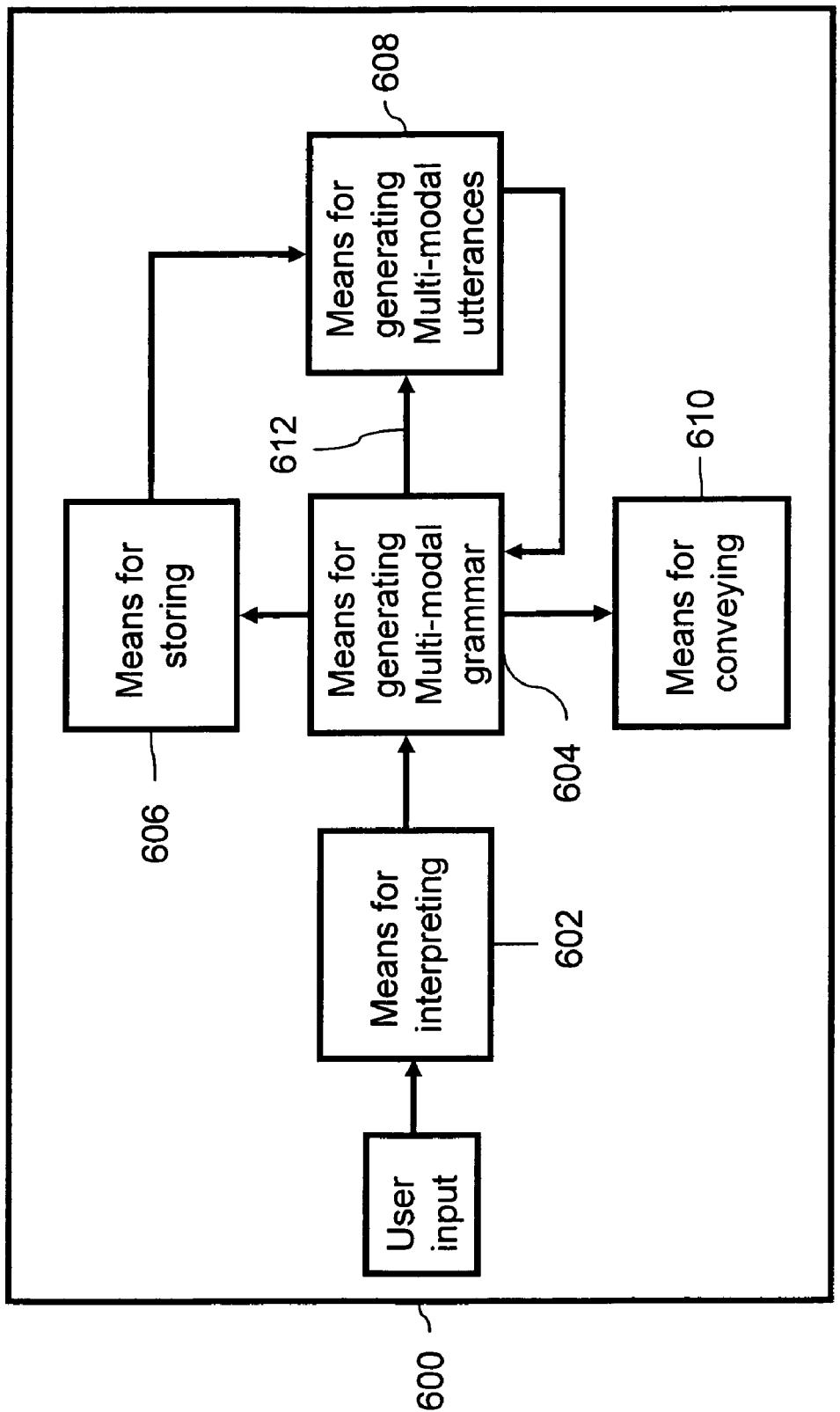
FIG. 6 is a block diagram of an electronic equipment, in accordance with some embodiments of the present invention.

Referring to FIG. 6, a block diagram shows an electronic equipment 600, in accordance with some embodiments of the present invention. The electronic equipment 600 includes a means for interpreting 602, a means for generating multi-modal grammar 604, a means for storing 606, a means for generating user multi-modal utterances 608, and a means for conveying 610. The means for interpreting 602 accepts and interprets user inputs and WCID questions. The information provided by the user in the user inputs is referred to as a current context of the dialog. The means for interpreting 602 records the modality availability information and the modality combinations used by the user in previous turns of the dialog. The means for generating multi-modal grammar 604 obtains interpretations of the WCID question from the means for interpreting 602. The means for generating multi-modal grammar 604 generates the multi-modal grammar 212, based on the current context of the dialog and the modality availability information. The means for storing 606 stores a visual context of the dialog. The means for generating user multi-modal utterances 608 generates one or more user multi-modal utterances, based on the multi-modal grammar 612 and the visual context of the dialog. Further, the means for generating user multi-modal utterances 608 ranks one or more user multi-modal utterances, based on the current context of the dialog, the modality availability information, and the modality preferences of the user. The means for conveying 610 conveys the ranked user multi-modal utterances to the user.

It will be appreciated that the method for assisting a user in interacting with a multi-modal dialog system described herein, may comprise one or more conventional processors and unique stored program instructions that control the one or more processors to implement some, most, or all of the functions described herein; as such, the functions of generating multi-modal interpretations and generating combined semantic meaning representations may be interpreted as being steps of the method. Alternatively, the same functions could be implemented by a state machine that has no stored program instructions, in which each function or some combinations of certain portions of the functions are implemented as custom logic. A combination of the two approaches could be used. Thus, methods and means for performing these functions have been described herein.

The method for generating user multi-modal utterances, described herein, can be used in multi-modal devices, to assist users in interacting with the multi-modal devices, for example, a handset which a user can input with speech, a keypad, or a combination of both. The method can also be used in multi-modal applications of personal communication systems (PCS). It can also be used in commercial equipment, ranging from extremely complicated computers and robots to simple pieces of test equipment. Further, its range of applications extends to all areas where access to information and browsing takes place with the aid of a multi-modal interface.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises", "comprising", "includes", "including" or any other variation thereof, are intended to cover a non-exclusive inclusion, such that a process, method, article, or apparatus that comprises a list of elements does not include only those elements but may include other elements not expressly listed or inherent to such process, method, article, or apparatus.

A "set" as used herein, means a non-empty set (i.e., for the sets defined herein, comprising at least one member). The term "another", as used herein, is defined as at least a second or more. The term "having", as used herein, is defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for assisting a user in interacting with a multi-modal dialog apparatus, the method comprising:
   interpreting by a processor of the multi-modal dialog apparatus a What Can I Do (WCID) type of question from the user that is received at a user interface device coupled to the multi-modal dialog apparatus;
   generating by the processor one or more user multi-modal utterances as sequences of words that a user may provide in the multi-modal inputs in a next turn of the dialog based on the WCID question and a multi-modal grammar, wherein the multi-modal grammar is based on a current context of a multi-modal dialog; and conveying the one or more user multi-modal utterances to the user at a user interface device coupled to the multi-modal dialog apparatus.

2. The method according to claim 1 further comprising de-referencing the one or more user multi-modal utterances using a visual context of the multi-modal dialog.

3. The method according to claim 2 further comprising storing the visual context of the multi-modal dialog.

4. The method according to claim 1, wherein generating the one or more user multi-modal utterances comprises generating the multi-modal grammar based on the current context of the multi-modal dialog.

5. The method according to claim 1 further comprising ranking the one or more user multi-modal utterances based on one or more of a group consisting of the current context of the multi-modal dialog, a user model and modality availability.

6. A multi-modal dialog apparatus comprising:
a user interface device;
a processor; and
a memory, wherein the memory stores programming instructions organized into functional groups that control the processor, the functional groups comprising
a multi-modal input fusion (MMIF) component, the multi-modal input fusion component accepting a What Can I Do (WCID) type of question from the user through the user interface device;
a dialog manager, the dialog manager generating a multi-modal grammar based on a current context of a multi-modal dialog;
a multi-modal utterance generator, the multi-modal utterance generator generating one or more user multi-modal utterances through the user interface device, as sequences of words that a user may provide in the multi-modal inputs in a next turn of the dialog based on the question and the multi-modal grammar.

7. The multi-modal dialog apparatus of claim 6 wherein the functional groups further comprise a multi-modal utterance ranker, the multi-modal utterance ranker ranking the one or more user multi-modal utterances based on one or more of a group consisting of a current context of the multi-modal dialog, a user model and modality availability.

8. The multi-modal dialog apparatus of claim 6 wherein the functional groups further comprise a visual context manager, the visual context manager storing a visual context of the multi-modal dialog.

9. The multi-modal dialog apparatus of claim 8, wherein the multi-modal utterance generator generates the one or more user multi-modal utterances based on the visual context of the multi-modal dialog.

10. The multi-modal dialog apparatus of claim 6 wherein the functional groups further comprise an output generator, the output generator conveying the one or more user multi-modal utterances to the user.

11. The multi-modal dialog apparatus of claim 6, wherein the MMIF component maintains and updates the modality availability.

12. The multi-modal dialog apparatus of claim 6, wherein the dialog manager interprets the question from the user.

13. The multi-modal dialog apparatus of claim 6, wherein the dialog manager maintains and updates the current context of the dialog.

* * * * *